United States Patent
Tobo et al.

(10) Patent No.: US 9,921,861 B2
(45) Date of Patent: Mar. 20, 2018

(54) VIRTUAL MACHINE MANAGEMENT METHOD AND INFORMATION PROCESSING APPARATUS

(71) Applicant: FUJITSU LIMITED, Kawasaki-shi, Kanagawa (JP)

(72) Inventors: Yasuhide Tobo, Chita (JP); Ichiro Kotani, Nagoya (JP); Yoshikazu Oda, Gifu (JP); Yukihisa Miyagawa, Tsushima (JP); Kiyoshi Kouge, Kuwana (JP); Kenichi Shimazaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/309,203

(22) Filed: Jun. 19, 2014

(65) Prior Publication Data
US 2015/0007177 A1  Jan. 1, 2015

(30) Foreign Application Priority Data
Jun. 26, 2013  (JP) ................. 2013-133475

(51) Int. Cl.
*G06F 9/455*  (2006.01)
*G06F 9/50*  (2006.01)
(Continued)

(52) U.S. Cl.
CPC ...... *G06F 9/45533* (2013.01); *G06F 9/45558* (2013.01); *G06F 9/5088* (2013.01);
(Continued)

(58) Field of Classification Search
CPC ............ G06F 9/45533; G06F 9/45558; G06F 9/5088; G06F 11/301; G06F 11/3419
See application file for complete search history.

(56) References Cited

U.S. PATENT DOCUMENTS

| 6,728,957 B1 * | 4/2004 | Nakazato ............ G06F 11/3419 714/E11.195 |
| 9,569,236 B2 * | 2/2017 | Birke .................. G06F 9/45533 |

(Continued)

FOREIGN PATENT DOCUMENTS

| JP | 2008-217332 | 9/2008 |
| JP | 4180638 | 11/2008 |

(Continued)

OTHER PUBLICATIONS

Sugai Koji, Virtual Machine Management Program and Virtual Machine Management Apparatus, Mar. 24, 2010, retrieved online on Dec. 2, 2015, pp. 1-24. Retrieved from Internet: <URL: https://www4.j-platpat.inpit.go.jp/cgi-bin/tran_web_cgi_ejje?>.*

(Continued)

*Primary Examiner* — Hanh T Bui
(74) *Attorney, Agent, or Firm* — Fujitsu Patent Center

(57) ABSTRACT

An information processing apparatus calculates, at the time of moving a virtual machine which operates on a first physical machine, an amount of a first resource which the virtual machine can use on a second physical machine without sharing with another virtual machine. The information processing apparatus estimates response time of the virtual machine at the time of moving the virtual machine to the second physical machine on the basis of response time of the virtual machine at the time of the virtual machine operating on the first physical machine and the amount of the first resource. At this time the information processing apparatus uses different algorithms at the time of a resource used by the virtual machine being within the first resource and at the time of the virtual machine using a second resource which the virtual machine shares with another virtual machine.

7 Claims, 14 Drawing Sheets

(51) Int. Cl.
G06F 11/30 (2006.01)
G06F 11/34 (2006.01)

(52) U.S. Cl.
CPC ........ *G06F 11/301* (2013.01); *G06F 11/3419* (2013.01); *G06F 11/3409* (2013.01); *G06F 11/3476* (2013.01); *G06F 2009/4557* (2013.01); *G06F 2201/81* (2013.01); *G06F 2209/5019* (2013.01)

(56) References Cited

U.S. PATENT DOCUMENTS

| | | | | |
|---|---|---|---|---|
| 2012/0246638 | A1* | 9/2012 | He | G06F 9/45558 718/1 |
| 2014/0215464 | A1* | 7/2014 | Birke | G06F 9/45533 718/1 |
| 2014/0258546 | A1* | 9/2014 | Janssens | G06F 9/5088 709/226 |

FOREIGN PATENT DOCUMENTS

| | | |
|---|---|---|
| JP | 2011-70522 | 4/2011 |
| JP | 2011-192049 | 9/2011 |
| JP | 2011-526035 | 9/2011 |
| JP | 2011-198332 | 10/2011 |
| WO | 2006/046297 | 5/2006 |
| WO | 2009/158178 | 12/2009 |

OTHER PUBLICATIONS

Jun Guo et al., Research on Virtual Machine Response Time Prediction Method Based on GA-BP Neural Network, Jan. 2014, retrieved online on Sep. 19, 2017, pp. 1-9. Retrieved from the Internet: <URL: https://www.hindawi.com/journals/mpe/2014/141930/>.*

Dan Zhang and Luo Si, Modeling Search Response Time, ACM, Jul. 2009, retrieved online on Jul. 19, 2017, pp. 730-731. Retrieved from the Internet: <URL: http://delivery.acm.org/10.1145/1580000/1572100/p730-zhang.pdf?>.*

* cited by examiner

PHYSICAL MACHINE TABLE                                       111

| PHYSICAL MACHINE NAME | CPU | RAM | VIRTUAL MACHINE NUMBER | VIRTUAL MACHINE NAME |
|---|---|---|---|---|
| M1 | 2 GHz | 2 GB | 2 | VM1, VM2 |
| Ma | 4 GHz | 4 GB | 2 | VMa1, VMa2 |
| Mb | 8 GHz | 16 GB | 2 | VMb1, VMb2 |

FIG. 8

VIRTUAL MACHINE TABLE 112

| VIRTUAL MACHINE NAME | ASSIGNED CPU | ASSIGNED RAM | STATE |
|---|---|---|---|
| VM1 | 1.6 GHz | 1 GB | EXECUTING |
| VM2 | 0.8 GHz | 1 GB | EXECUTING |
| VMa1 | 3.4 GHz | 1 GB | STOPPED |
| VMa2 | 1.2 GHz | 1 GB | STOPPED |
| ⋮ | ⋮ | ⋮ | ⋮ |

FIG. 9

OPERATION LOG TABLE 113

| VIRTUAL MACHINE NAME | TIME | USED CPU | USED RAM | TRANSACTION | RESPONSE |
|---|---|---|---|---|---|
| VM2 | 2012/11/10 09:00:00 | 50.0 % | 300 MB | 400 | 0.4 s |
| VM2 | 2012/11/10 09:10:00 | 31.2 % | 320 MB | 250 | 0.25 s |
| VM2 | 2012/11/10 09:20:00 | 12.5 % | 315 MB | 100 | 0.1 s |
| VM2 | 2012/11/10 09:30:00 | 2.5 % | 301 MB | 20 | 0.02 s |
| VM2 | 2012/11/10 09:40:00 | 60.0 % | 501 MB | 500 | 50.4 s |
| ⋮ | ⋮ | ⋮ | ⋮ | ⋮ | ⋮ |

FIG. 10

RESPONSE TIME TABLE 114

| TRANSACTION | RESPONSE | DIFFERENTIAL |
|---|---|---|
| 100 % | 30.0 s | + 29.6 s |
| ⋮ | ⋮ | ⋮ |
| 90 % | 10.3 s | + 9.9 s |
| 89 % | 9.4 s | + 9.0 s |
| 88 % | 8.7 s | + 8.3 s |
| ⋮ | ⋮ | ⋮ |
| 81 % | 1.0 s | + 0.6 s |
| 80 % | 0.4 s | 0 s |

FIG. 13

VIRTUAL MACHINE MANAGEMENT METHOD AND INFORMATION PROCESSING APPARATUS

CROSS-REFERENCE TO RELATED APPLICATION

This application is based upon and claims the benefit of priority of the prior Japanese Patent Application No. 2013-133475, filed on Jun. 26, 2013, the entire contents of which are incorporated herein by reference.

FIELD

The embodiments discussed herein are related to a virtual machine management method and an information processing apparatus.

BACKGROUND

At present a computer virtualization technique by which one or more virtual computers (which may be referred to as virtual machines) are made to operate on a physical computer (which may be referred to as a physical machine) is utilized. The utilization of the virtualization technique makes it possible to make virtual machines of a plurality of users operate on one physical machine. At this time information processing by a user may be separated from information processing by another user in order to prevent interference. Furthermore, a resource, such as a CPU (Central Processing Unit) resource or a RAM (Random Access Memory) resource, included in a physical machine may be assigned flexibly to the plurality of users. Accordingly, the virtualization technique is frequently utilized in information processing systems, such as data centers, used by many users.

Control software (referred to as, for example, a hypervisor or a management OS (Operating System)) for controlling a plurality of virtual machines is executed on a physical machine. The control software assigns a resource included the physical machine to the plurality of virtual machines. A user OS is executed on each virtual machine. At this time the plurality of virtual machines are independent of one another. A user OS on each virtual machine manages a resource assigned by the control software and exercises control so that application software will be executed within the assigned resource.

In some information processing systems including a plurality of physical machines, a virtual machine can be moved from one physical machine to another (migration). A virtual machine may be moved without stopping it (live migration). A part of virtual machines which operate on a physical machine which is short of resources are moved to another physical machine. This may improve the processing speed of the moved virtual machines. A virtual machine management apparatus which predicts the amount of a future increase in resources used by each virtual machine and which determines a movement destination of each virtual machine so that virtual machines for which the predicted amounts of future increases are close to one another will be deployed on the same physical machine is proposed.

Japanese Laid-open Patent Publication No. 2011-198332

By the way, when a resource of a physical machine is assigned to virtual machines, the excess of the total of resource amounts assigned to the virtual machines over the amount of the resource of the physical machine may be allowed in order to improve efficiency in the use of the resource. This resource assignment method may be referred to as an "overcommit". For example, a virtual machine the load on which tends to become heavier in one time zone (in the daytime, for example) and a virtual machine the load on which tends to become heavier in another time zone (in the nighttime, for example) are combined and are deployed on the same physical machine. A resource of the physical machine is then overcommitted for these two virtual machines. This reduces a resource amount unused in each time zone and improves efficiency in the use of the resource, compared with a case where the resource is not overcommitted for the two virtual machines.

However, if an overcommit is performed, a resource assigned to one virtual machine includes a portion (non-shared portion) which the virtual machine does not share with another virtual machine and a portion (shared portion) which the virtual machine shares with another virtual machine. There is no guarantee that the virtual machine can use the shared portion. Therefore, if the loads on two or more virtual machines on the same physical machine increase at the same time contrary to expectation, at least a part of the virtual machines cannot use all resources assigned thereto.

When a response from a virtual machine is very slow in an information processing system in which an overcommit is performed, it is desirable to examine the movement of the virtual machine to another physical machine. For example, if a user and an operator of the information processing system agree on a tolerable level of response time (period from the time when a request is received to the time when a response is returned, for example), then it is desirable to make response time shorter than or equal to the tolerable level.

However, if an overcommit is performed, it is not easy for conventional techniques regarding virtual machine management which are not premised on an overcommit to predict whether or not response time is improved by moving a virtual machine. There is a risk that a virtual machine will compete with another virtual machine for a shared portion of a resource assigned to the virtual machine. Accordingly, if response time is simply estimated on the basis of a resource amount assigned, a risk on the shared portion is not evaluated.

SUMMARY

According to an aspect, there is provided a computer-readable, non-transitory storage medium storing a computer program that causes a computer to perform a process including: calculating, at the time of moving a virtual machine that operates on a first physical machine, an amount of a first resource that the virtual machine can use on a second physical machine without sharing with another virtual machine based on state information that indicates a deployment state of other virtual machines on the second physical machine; and estimating second response time of the virtual machine at the time of moving the virtual machine to the second physical machine on the basis of first response time of the virtual machine at the time of the virtual machine operating on the first physical machine and the amount of the first resource, wherein a first algorithm used for estimating the second response time at the time of a resource used by the virtual machine being within the first resource and a second algorithm used for estimating the second response time at the time of the virtual machine using a second resource which the virtual machine shares on the second physical machine with another virtual machine are different.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 indicates an example of a physical machine table;

FIG. 9 indicates an example of a virtual machine table;

FIG. 10 indicates an example of an operation log table;

FIG. 13 indicates an example of a response time table; and

DESCRIPTION OF EMBODIMENTS

Figure 1:
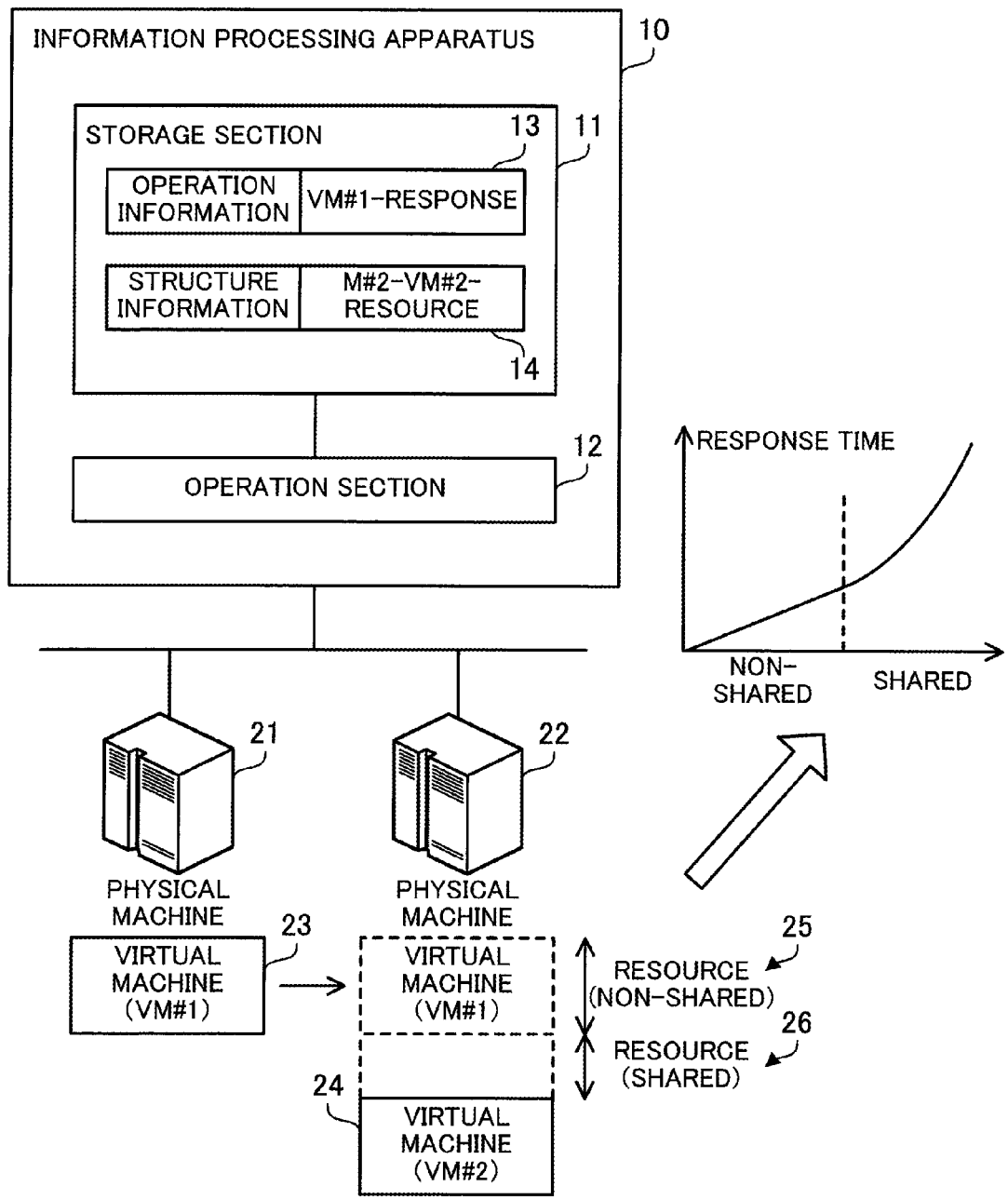
FIG. 1 illustrates an information processing system according to a first embodiment.

Embodiments will now be described with reference to the accompanying drawings, wherein like reference numerals refer to like elements throughout.

First Embodiment

FIG. 1 illustrates an information processing system according to a first embodiment.

An information processing system according to a first embodiment uses the computer virtualization technique for making a plurality of virtual machines of the same user or different users operate. This information processing system is installed in, for example, a data center used by a plurality of users.

The information processing system includes an information processing apparatus 10 and a plurality of physical machines including physical machines 21 and 22. The information processing apparatus 10 may be a client computer, such as a terminal unit, operated by a person or a server computer. Each of the physical machines 21 and 22 is a computer on which a plurality of virtual machines can operate, and is, for example, a server computer. The information processing apparatus 10 and the physical machines 21 and 22 are connected via, for example, a network.

At least one virtual machine 23 (VM#1) operates on the physical machine 21. Application software, such as a Web application, which returns a response in response to a request may be executed on the virtual machine 23. At least one virtual machine 24 (VM#2) operates on the physical machine 22. However, each virtual machine may be moved (migration) from one physical machine to another under the control of the information processing apparatus 10. When the virtual machine 23 moves from the physical machine 21 to the physical machine 22, a resource of the physical machine 22 is assigned to the virtual machine 23. A resource is, for example, a computing resource such as a CPU resource or a RAM resource.

In the first embodiment an overcommit is performed. As a result, when a plurality of virtual machines operate on the physical machine 22, the total of resource amounts assigned to these virtual machines may exceed the amount of a resource included in the physical machine 22. If the virtual machine 23 moves from the physical machine 21 to the physical machine 22, the virtual machines 23 and 24 may share a part of the resource included in the physical machine 22.

The information processing apparatus 10 manages a plurality of virtual machines including the virtual machines 23 and 24. The information processing apparatus 10 includes a storage section 11 and an operation section 12. The storage section 11 may be volatile storage, such as a RAM, or nonvolatile storage, such as a HDD. The operation section 12 is, for example, a processor. The processor may be a CPU or a DSP (Digital Signal Processor) or may include a circuit, such as an ASIC (Application Specific Integrated Circuit) or a FPGA (Field Programmable Gate Array). The processor executes a program stored in, for example, a memory (storage section 11, for example).

The storage section 11 stores operation information 13 and structure information 14. The operation information 13 and the structure information 14 may be acquired from the physical machines 21 and 22. The operation information 13 indicates response time of the virtual machine 23 which operates on the physical machine 21. For example, response time is a period from the time when the virtual machine 23 receives a request to the time when the virtual machine 23 transmits a response corresponding to the request or the average of these periods. The structure information 14 indicates the deployment state of virtual machines on the physical machine 22. The structure information 14 may include information regarding a resource amount assigned to each virtual machine which operates on the physical machine 22.

The operation section 12 examines the movement of the virtual machine 23 from the physical machine 21 to another physical machine with, for example, the fact that response time of the virtual machine 23 exceeds a tolerable level as a turning point. If the physical machine 22 is a candidate movement destination, then the operation section 12 estimates response time after the movement of the virtual machine 23 from the physical machine 21 to the physical machine 22. If the response time after the movement of the virtual machine 23 from the physical machine 21 to the physical machine 22 meets a determined condition, then the operation section 12 may determine the movement of the virtual machine 23 from the physical machine 21 to the physical machine 22.

"to estimate response time" may be to calculate a predicted value of response time after movement, to determine whether or not response time is improved compared with before movement, or to calculate an amount by which response time is improved compared with before movement. "response time" may be expressed as a function including a load value, such as the number of requests that are being handled, as a variable or be response time corresponding to a certain load state (at the time when the number of requests that are being handled is a certain value, for example).

To be concrete, the operation section 12 calculates, based on the deployment state indicated by the structure information 14, an amount of a resource (non-shared resource) 25 which the virtual machine 23 can use without sharing with another virtual machine, such as the virtual machine 24, on the physical machine 22. For example, the resource 25 is a resource, of resources assigned to the virtual machine 23, which the virtual machine 23 occupies and which, even if a second virtual machine uses all of resources assigned thereto, is not used by the second virtual machine. On the basis of response time of the virtual machine 23 on the physical machine 21 indicated by the operation information 13 and the amount of the resource 25 calculated, the operation section 12 then estimates response time of the virtual machine 23 on the assumption that the virtual machine 23 moves to the physical machine 22.

At this time there are a case (first case) where a resource which the virtual machine 23 uses is within the resource 25 and a case (second case) where the virtual machine 23 uses a resource 26 which the virtual machine 23 shares with another virtual machine. The operation section 12 uses different algorithms for the two cases. The resource 26 is, for example, a resource, of a resource of the physical machine 22 assigned to the virtual machine 23, for which the virtual machine 23 competes with another virtual machine and the usability of which is not guaranteed to the virtual machine 23.

If a resource amount used is smaller than or equal to the amount of the resource 25, then the virtual machine 23 uses only the non-shared portion of the resource assigned thereto. This corresponds to the first case. On the other hand, if a resource amount used is larger than the amount of the resource 25, then the virtual machine 23 uses not only the non-shared portion but also the shared portion of the resources assigned thereto. This corresponds to the second case.

In the first case, the operation section 12 uses, for example, an algorithm based on the assumption that there is a linear relationship between response time and the number of requests. The linear relationship includes a relationship in which response time is expressed as a linear function of the number of requests. In the second case, on the other hand, the operation section 12 uses, for example, an algorithm based on the assumption that there is a nonlinear relationship between response time and the number of requests. The nonlinear relationship includes a relationship in which response time is expressed as a nonlinear function, such as an exponential function, of the number of requests. There is a strong possibility that an increase in response time caused in the second case by an increase in the number of requests is larger than an increase in response time caused in the first case by an increase in the number of requests.

With the information processing system according to the first embodiment the amount of the resource 25 which the virtual machine 23 can use on the physical machine, which is a candidate for a movement destination of the virtual machine 23, without sharing with another virtual machine is calculated. Furthermore, in order to estimate response time on the physical machine 22, different algorithms are used for the case where the virtual machine 23 performs operation within the resource 25, which is the non-shared portion, and the case where the virtual machine 23 uses the resource 26, which is the shared portion. This makes it possible to estimate the risk of competing with another virtual machine for the resource 26, which is the shared portion. Accordingly, even if an overcommit is performed, accuracy in estimating response time is improved. In addition, the virtual machine 23 can be moved to a physical machine on which there is a strong possibility that response time is improved.

Second Embodiment

Figure 2:
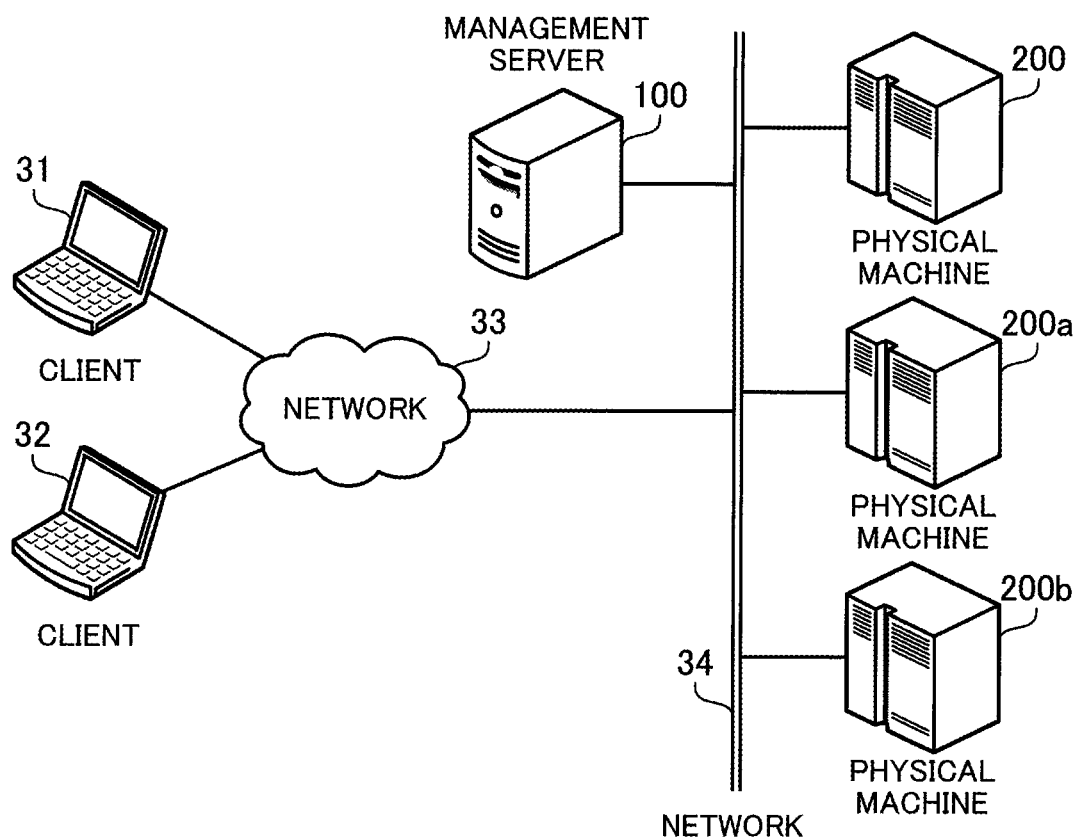
FIG. 2 illustrates an information processing system according to a second embodiment.

FIG. 2 illustrates an information processing system according to a second embodiment.

An information processing system according to a second embodiment includes a plurality of clients including clients 31 and 32, networks 33 and 34, a management server 100, and a plurality of physical machines including physical machines 200, 200a, and 200b. The management server 100 is an example of the information processing apparatus 10 in the first embodiment. The physical machines 200, 200a, and 200b are examples of the physical machines 21 and 22 in the first embodiment.

The clients 31 and 32 are connected to the network 33. The network 33 is, for example, a wide area network such as an internet. The management server 100 and the physical machines 200, 200a, and 200b are connected to the network 34. The network 34 is, for example, a private LAN (Local Area Network) such as a data center. The networks 33 and 34 are connected to each other. The clients 31 and 32 gain access to the physical machines 200, 200a, and 200b via the networks 33 and 34.

Each of the clients 31 and 32 is a client computer which transmits a request to the physical machine 200, 200a, or 200b and which receives a response to the request. Each of the clients 31 and 32 may be a terminal unit operated by a person. Communication between the clients 31 and 32 and the physical machines 200, 200a, and 200b is performed in accordance with, for example, HTTP (Hypertext Transfer Protocol). In that case, a Web browser may be executed on each of the clients 31 and 32 as a client application.

The management server 100 is a server computer which manages the physical machines 200, 200a, and 200b and virtual machines that operate on the physical machines 200, 200a, and 200b. However, the management server 100 may be a terminal unit operated by a manager. The management server 100 collects from the physical machines 200, 200a, and 200b structure information indicative of resources included in the physical machines 200, 200a, and 200b and a state in which the resources are assigned to virtual machines and an operation log indicative of a load on each virtual machine. The management server 100 controls the movement (migration) of a virtual machine from one physical machine to another according to a load on each virtual machine. When a virtual machine is moved, the virtual machine may be stopped or may not be stopped (live migration).

Each of the physical machines 200, 200a, and 200b is a server computer on which a plurality of virtual machines may operate. A virtual machine is deployed on the physical machine 200, 200a, or 200b under the control of the management server 100 or is moved from one physical machine to another under the control of the management server 100. When a virtual machine is moved, data regarding the virtual machine stored in a RAM, a HDD, and the like is moved from one physical machine to another. Virtual machines generated in response to requests from different users (virtual machines which differ in contractor, for example) may mingle on the same physical machine. An OS is executed independently on each virtual machine, so information processing by one user is clearly separated from information processing by another.

Application software which returns a response in response to a request is executed on each virtual machine. An example of the application software is a Web application which returns a HTTP response in response to a HTTP request. When a virtual machine receives a request from the client 31 or 32, the virtual machine performs a series of processes (transaction) corresponding to the request, and transmits a response indicative of a result obtained by performing the transaction.

When a virtual machine receives another request in a state in which the virtual machine has not yet completed a transaction corresponding to a request, the virtual machine performs a plurality of transactions in parallel. An increase in the number of transactions performed in parallel (hereinafter this may simply be referred to as a "transaction number") may lead to an increase in the amount of a resource, such as a CPU resource or a RAM resource, used. In addition, an increase in transaction number may lead to an increase in response time required to return a response to one request.

Figure 3:
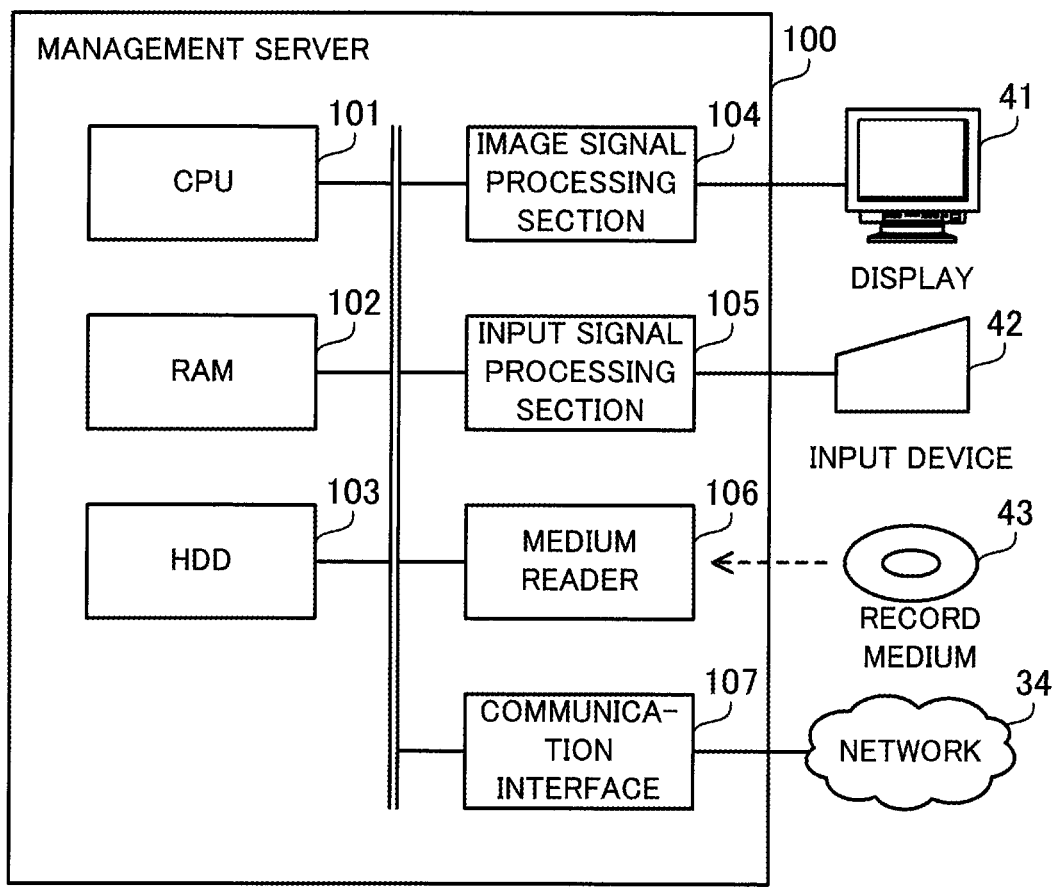
FIG. 3 is a block diagram of an example of hardware of a management server.

FIG. 3 is a block diagram of an example of hardware of the management server.

The management server 100 includes a CPU 101, a RAM 102, a HDD 103, an image signal processing section 104, an input signal processing section 105, a medium reader 106, and a communication interface 107. The CPU 101 is an example of the operation section 12 in the first embodiment. The RAM 102 or the HDD 103 is an example of the storage section 11 in the first embodiment.

The CPU 101 is a processor including an operation circuit which executes a program instruction. The CPU 101 loads into the RAM 102 at least a part of a program or data stored in the HDD 103, and executes the program. The CPU 101 may include a plurality of processor cores. The management server 100 may include a plurality of processors. Processes described later may be performed in parallel by the use of a plurality of processors or processor cores. In addition, a set of a plurality of processors (multiprocessor) may be referred to as a "processor".

The RAM 102 is a volatile memory which temporarily stores a program that the CPU 101 executes or data that the CPU 101 uses for performing an operation. The management server 100 may include a memory which differs from a RAM in type, or include a plurality of memories.

The HDD 103 is a nonvolatile storage unit which stores programs, such as an OS, middleware, and application software, and data. The management server 100 may include a storage unit of another type, such as a flash memory or a SSD (Solid State Drive), or include a plurality of nonvolatile storage units.

In accordance with an instruction from the CPU 101, the image signal processing section 104 outputs an image to a display 41 connected to the management server 100. A CRT (Cathode Ray Tube) display, a LCD (Liquid Crystal Display), a PDP (Plasma Display Panel), an OEL (Organic ElectroLuminescence) display, or the like is used as the display 41.

The input signal processing section 105 acquires an input signal from an input device 42 connected to the management server 100, and outputs it to the CPU 101. A pointing device, such as a mouse, a touch panel, a touch pad, or a track ball, a keyboard, a remote controller, a button switch, or the like is used as the input device 42. Furthermore, input devices of plural types may be connected to the management server 100.

The medium reader 106 is a reader which reads a program or data recorded on a record medium 43. A magnetic disk, such as a FD (Flexible Disk) or a HDD, an optical disk, such as a CD (Compact Disc) or a DVD (Digital Versatile Disc), a MO (Magneto-Optical disk), a semiconductor memory, or the like is used as the record medium 43. For example, the medium reader 106 stores in the RAM 102 or the HDD 103 a program or data which it reads from the record medium 43.

The communication interface 107 is an interface which is connected to the network 34 and which communicates with the physical machines 200, 200a, and 200b via the network 34. The communication interface 107 may be a wired communication interface connected to a communication device by a cable or a radio communication interface connected to a base station by a radio link.

The management server 100 may not include the medium reader 106. In addition, if the management server 100 is controlled by a terminal unit via the network 34, then the management server 100 may not include the image signal processing section 104 or the input signal processing section 105. Furthermore, the display 41 or the input device 42 and an enclosure of the management server 100 may integrally be formed. The clients 31 and 32 and the physical machines 200, 200a, and 200b are also realized by the use of hardware which is the same as that of the management server 100.

Figure 4:
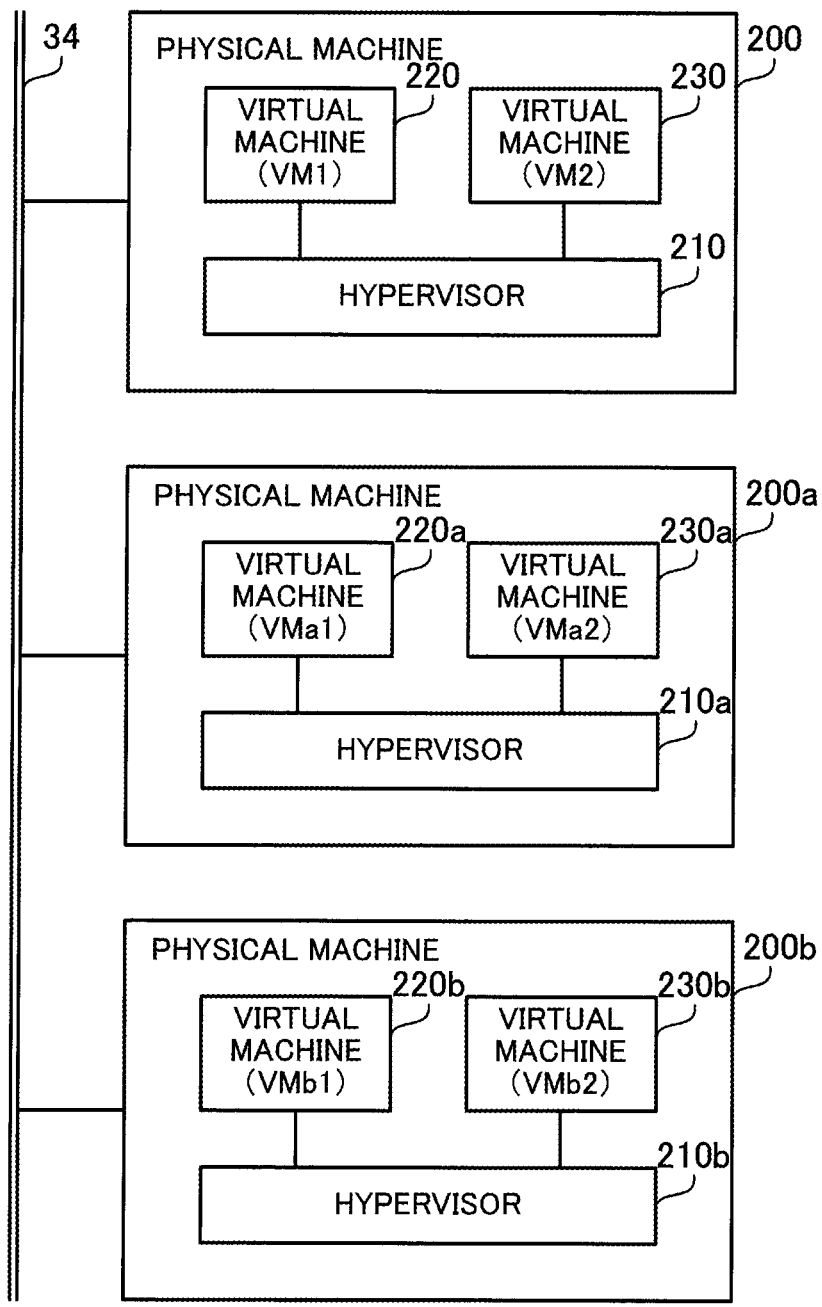
FIG. 4 is a block diagram of an example of the deployment of virtual machines.

FIG. 4 is a block diagram of an example of the deployment of virtual machines.

The physical machine 200 includes a hypervisor 210, a virtual machine 220 (VM1), and a virtual machine 230 (VM2). The physical machine 200a includes a hypervisor 210a, a virtual machine 220a (VMa1), and a virtual machine 230a (VMa2). The physical machine 200b includes a hypervisor 210b, a virtual machine 220b (VMb1), and a virtual machine 230b (VMb2). The virtual machines 220, 220a, 220b, 230, 230a, and 230b are examples of the virtual machines 23 and 24 in the first embodiment.

Each of the hypervisors 210, 210a, and 210b is control software which assigns a hardware resource of a physical machine to a virtual machine and which makes a plurality of virtual machines operate in parallel on the same physical machine. The hypervisor 210 controls the virtual machines 220 and 230 deployed on the physical machine 200. The hypervisor 210a controls the virtual machines 220a and 230a deployed on the physical machine 200a. The hypervisor 210b controls the virtual machines 220b and 230b deployed on the physical machine 200b. However, each of the hypervisors 210, 210a, and 210b can move a virtual machine.

In the second embodiment a CPU resource and a RAM resource will be discussed mainly as resources assigned to each virtual machine. A CPU resource amount is expressed as a CPU clock number. A virtual machine recognizes that it includes a CPU corresponding to a designated clock number, and can use the CPU up to the designated clock number. A RAM resource amount is expressed as the size of a RAM area. A virtual machine recognizes that it has a RAM whose area corresponds to a designated size, and can use a RAM area up to the designated size.

Figure 5:
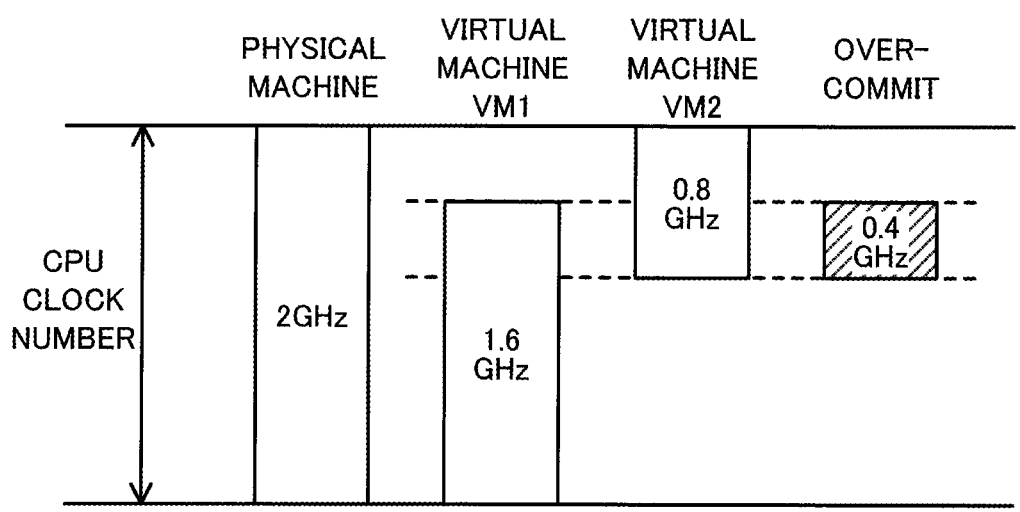
FIG. 5 illustrates an example of an overcommit of a CPU resource.

FIG. 5 illustrates an example of an overcommit of a CPU resource.

In the second embodiment it is assumed that a CPU resource can be overcommitted for virtual machines. If an overcommit is performed, the total of CPU resource amounts assigned to virtual machines which operate on a physical machine exceeds the amount of a CPU resource included in the physical machine. If there is a tendency among a plurality of virtual machines to receive requests which significantly differ in number among different time zones, then these virtual machines are combined and are deployed on the same physical machine. A CPU resource is overcommitted for these virtual machines. This improves the efficiency of the use of the CPU resource.

For example, it is assumed that the physical machine 200 includes a 2-gigahertz CPU resource. 2 GHz as a CPU resource amount may be a clock number of one CPU or the total of clock numbers of two or more CPUs. In addition, it is assumed that an overcommit is performed to assign a 1.6-gigahertz CPU resource to the virtual machine 220 (VM1) and assign a 0.8-gigahertz CPU resource to the virtual machine 230 (VM2).

In this case, the virtual machine 220 can use the CPU resource up to at least 1.2 GHz regardless of a load on the virtual machine 230, so it may safely be said that the virtual machine 220 has a 1.2-gigahertz occupied portion. Furthermore, the virtual machine 230 can use the CPU resource up to at least 0.4 GHz regardless of a load on the virtual machine 220, so it may safely be said that the virtual machine 230 has a 0.4-gigahertz occupied portion. On the other hand, the remaining 0.4-gigahertz CPU resource is an overcommitted portion and it may safely be said that the virtual machines 220 and 230 share the overcommitted portion. If time zones in which the loads on the virtual machines 220 and 230 are heavy differ, then the overcommitted portion (shared portion) is utilized efficiently.

However, there is a possibility that the number of transactions on the virtual machines 220 and 230 accidentally increases at the same time and that both of the virtual machines 220 and 230 attempt to use the overcommitted portion of the CPU resource. A case where the virtual machine 220 uses all of the 1.6-gigahertz CPU resource and where the virtual machine 230 can use up to only 0.4 GHz (50%) of the 0.8-gigahertz CPU resource assigned thereto will now be discussed mainly.

In this case, a CPU usage rate of the virtual machine 230 is 50%, so it is difficult to determine only from the CPU usage rate that the virtual machine 230 is short of a CPU resource. On the other hand, a CPU resource amount which the virtual machine 230 can practically use has reached the upper limit. As a result, an increase in the number of transactions may cause a sudden increase in response time of the virtual machine 230. Accordingly, when response time of the virtual machine 230 increases, the management server 100 determines that the virtual machine 230 is short of a CPU resource, and examines the movement of the virtual machine 230 to another physical machine.

Figure 6:
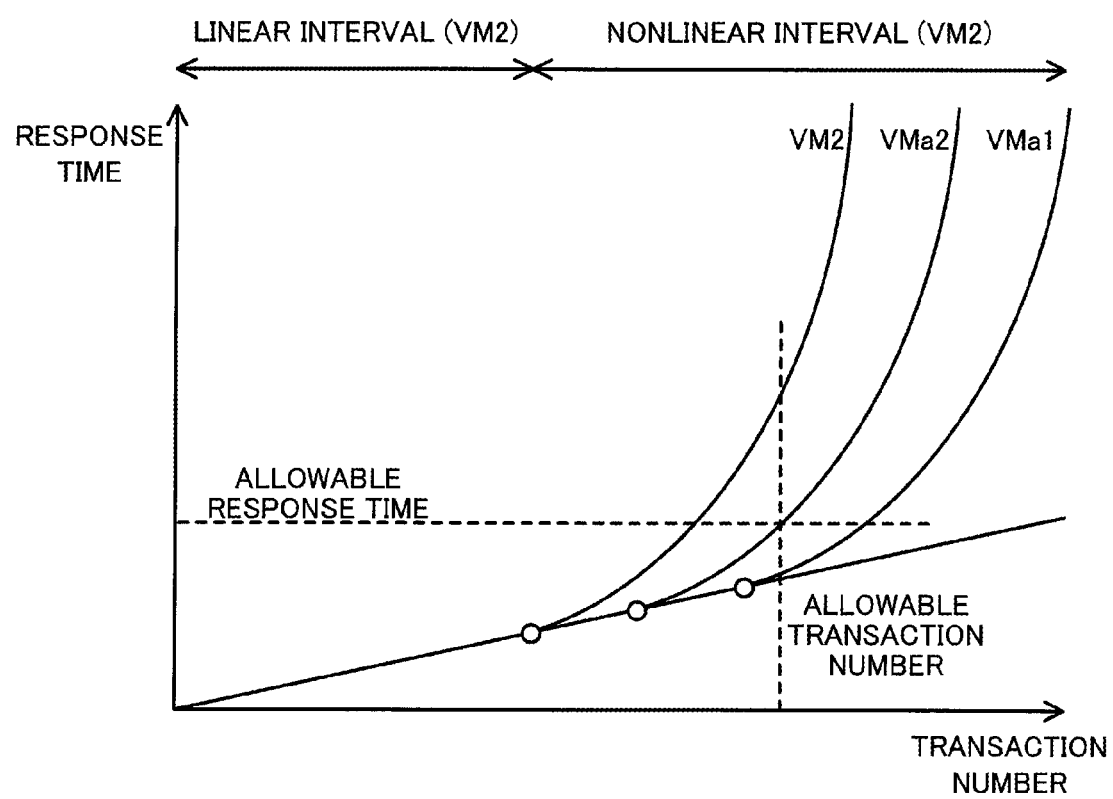
FIG. 6 is a graph indicative of an example of the relationship between a transaction number and response time.

FIG. 6 is a graph indicative of an example of the relationship between a transaction number and response time.

Until a CPU resource amount used reaches the upper limit (CPU resource boundary point) of an occupied portion, the virtual machine 230 deals with an increase in transaction number by increasing a CPU resource amount to be used. In the example of FIG. 5, a CPU resource boundary point of the virtual machine 230 is 0.4 GHz. Until a CPU resource amount used reaches the CPU resource boundary point, response time per transaction merely increases gradually with an increase in transaction number.

On the other hand, after a CPU resource amount used reaches the CPU resource boundary point, there is a possibility that even if a transaction number increases further, the virtual machine 230 cannot increase a CPU resource amount to be used. Whether or not the virtual machine 230 can increase a CPU resource amount to be used or how much the virtual machine 230 can increase a CPU resource amount to be used depends on the state of the operation of the virtual machine 220 which operates on the same physical machine. In the worst case where the virtual machine 230 cannot use any of a shared portion, response time suddenly increases after a CPU resource amount used reaches the CPU resource boundary point.

As stated above, it is desirable to model response time corresponding to a transaction number not by one method in the whole range of a CPU resource amount assigned but by different methods according to whether or not a CPU resource amount used reaches the CPU resource boundary point. An interval in which a CPU resource amount used does not reach the CPU resource boundary point is modeled as, for example, a linear function. It may safely be said that this interval is a linear interval. On the other hand, an interval in which a CPU resource amount used has reached the CPU resource boundary point is modeled as, for example, an exponential function. It may safely be said that this interval is a nonlinear interval.

Parameter values, such as the slope of a straight line (coefficient of a first-order term, for example) in the linear interval and the slope of a curve (coefficient of an exponential term, for example) in the nonlinear interval, depend on application software which runs on the virtual machine 230. Even if the virtual machine 230 moves from the physical machine 200 to another physical machine, there is a strong possibility that the slope of the straight line or the gradient of the curve does not change. On the other hand, the boundary between the linear interval and the nonlinear interval depends on a physical machine on which the virtual machine 230 operates or another virtual machine which operates on the physical machine, so it may change if the virtual machine 230 moves from the physical machine 200 to another physical machine. At this time a curve in the nonlinear interval of a model shifts, for example, along a straight line in the linear interval.

It is assumed that a resource of the physical machine 200a assigned to the virtual machine 220a (VMa1) or the virtual machine 230a (VMa2) is released and that the virtual machine 230 is moved to the physical machine 200a. It is assumed that a CPU resource boundary point of a set of usable resources obtained by releasing the resource of the physical machine 200a assigned to the virtual machine 230a (VM (Virtual Machine) environment) is larger than the CPU resource boundary point of the virtual machine 230. In addition, it is assumed that a CPU resource boundary point of a VM environment of the virtual machine 220a is larger than the CPU resource boundary point of the virtual machine 230a. In this case, as indicated in FIG. 6, response time is improved by moving the virtual machine 230 to the physical machine 200a.

It is assumed that a maximum transaction number supposed (allowable transaction number) and the upper limit of allowed response time (allowable response time) are given for the virtual machine 230. In this case, a VM environment in which response time corresponding to the allowable transaction number is expected to be shorter than or equal to the allowable response time is a candidate movement destination for the virtual machine 230. In the example of FIG. 6, both of the VM environments for the virtual machines 220a and 230a meet this condition. From the viewpoint of the efficient use of the CPU resource, however, a VM environment in which a CPU resource boundary point is smaller is desirable because a CPU resource amount unused is smaller. Accordingly, the VM environment for the virtual machine 230a is more desirable as a movement destination for the virtual machine 230 than the VM environment for the virtual machine 220a.

A state of a virtual machine is an executing state, a stopped state, or an end state. A stopped state is a state in which information processing is temporarily stopped. A virtual machine in a stopped state may make a transition later to an executing state. It is not desirable to eliminate a virtual machine in a stopped state from on a physical machine, but it is possible to change the physical machine on which the virtual machine in a stopped state is deployed. An end state is a state in which information processing is permanently stopped. It is possible to release a resource assigned to a virtual machine in an end state and eliminate it from on a physical machine. In order to prevent response time from becoming longer, it is desirable not to move a virtual machine in an executing state to another physical machine except in the case of the determination that it is short of resources being made.

In the following description it is assumed that a VM environment for a virtual machine in a stopped or end state is mainly selected as a candidate movement destination for the virtual machine 230. By moving a virtual machine in a stopped state or eliminating a virtual machine in an end state, a CPU resource is secured for the virtual machine 230 on a movement destination physical machine. However, if there are CPU resources in the physical machine 200a or 200b which are not yet assigned to any virtual machines, then a VM environment which consists of a set made up of the CPU resources may be added to candidate movement destinations for the virtual machine 230.

Figure 7:
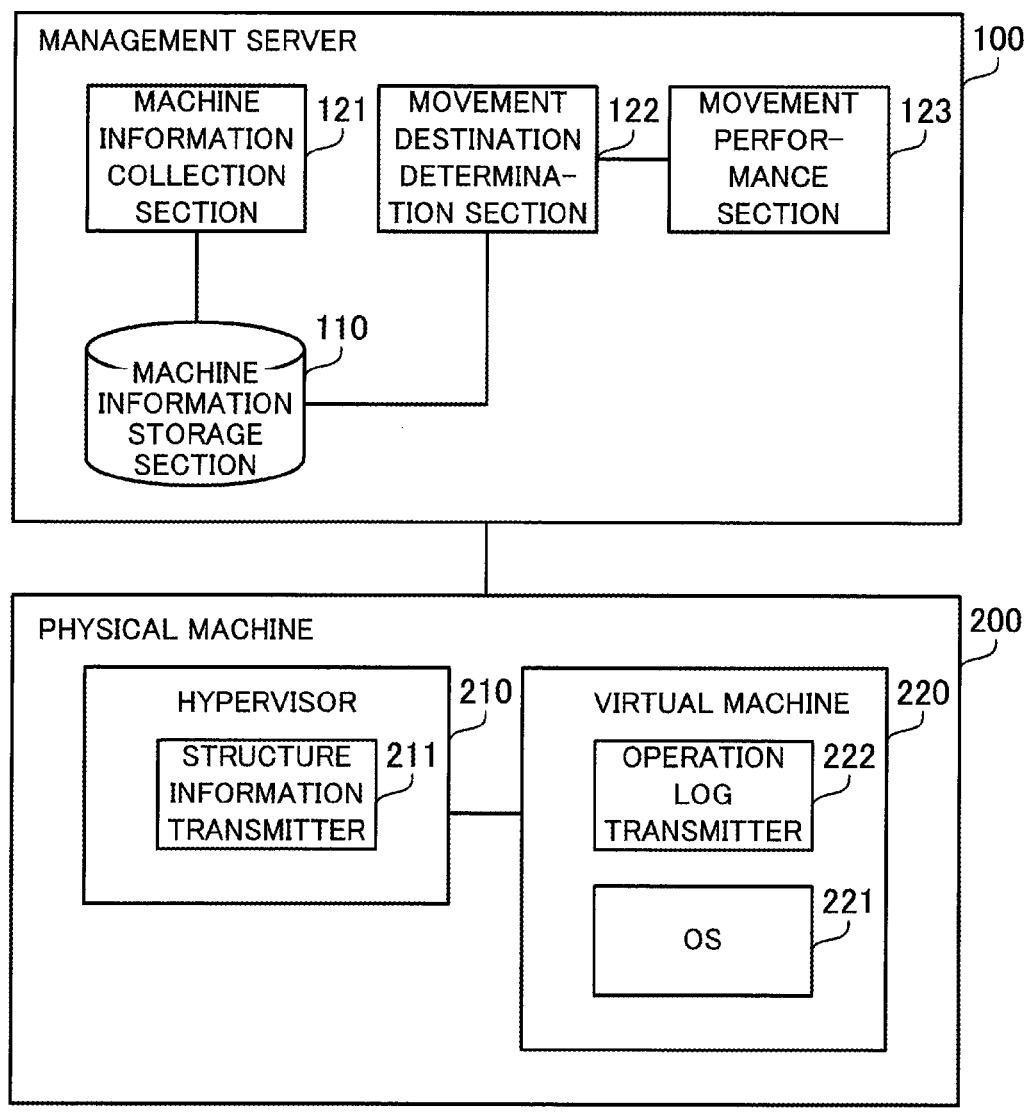
FIG. 7 is a block diagram of examples of software of a management server and a physical machine.

FIG. 7 is a block diagram of examples of software of the management server and the physical machine.

The management server 100 includes a machine information storage section 110, a machine information collection section 121, a movement destination determination section 122, and a movement performance section 123. The machine information storage section 110 is implemented, for example, as a storage area secured in the RAM 102 or the HDD 103 of the management server 100. The machine information collection section 121, the movement destination determination section 122, and the movement performance section 123 are implemented, for example, as program modules executed by the CPU 101 of the management server 100.

The machine information storage section 110 stores machine information regarding the physical machines 200, 200a, and 200b. The machine information includes structure information indicative of the structure of each physical machine and each virtual machine and an operation log indicative of a state of the operation of each virtual machine. The structure information indicates resources included in the physical machines 200, 200a, and 200b, virtual machines deployed on the physical machines 200, 200a, and 200b, and a resource assigned to each virtual machine. It is desirable that the machine information storage section 110 store the latest structure information. The operation log indicates a state in which the resources are used and a state in which transactions are performed, at a point of time. Operation logs for at least a determined period up to the present are accumulated in the machine information storage section 110.

The machine information collection section 121 continually (periodically, for example) collects machine information from the physical machines 200, 200a, and 200b and stores it in the machine information storage section 110. As described later, of the machine information, structure information is collected from a hypervisor of each physical machine and an operation log is collected from each virtual machine. Each operation log collected is added to the machine information storage section 110 so that operation logs for the determined period up to the present will be accumulated. In order to collect machine information, the machine information collection section 121 may gain regular access to the physical machines 200, 200a, and 200b. Furthermore, the physical machines 200, 200a, and 200b may gain regular or irregular access to the management server 100.

The movement destination determination section 122 detects a virtual machine which is short of resources on the basis of an operation log stored in the machine information storage section 110. A virtual machine which is short of resources is, for example, a virtual machine whose response time exceeds a threshold or a virtual machine for which the amount or rate of an increase in response time over the last time exceeds a threshold. Thresholds may differ among different virtual machines. When the movement destination determination section 122 detects a virtual machine which is short of resources, the movement destination determination section 122 searches for a VM environment on another physical machine, which is a possible movement destination, on the basis of machine information stored in the machine information storage section 110.

At this time the movement destination determination section 122 calculates a function indicative of the relationship between a transaction number and response time at the time of the detected virtual machine operating on a current physical machine in each of a linear interval and a nonlinear interval. In addition, the movement destination determination section 122 calculates a CPU resource boundary point of a VM environment on another physical machine. On the basis of the calculated functions and a CPU resource boundary point of each VM environment, the movement destination determination section 122 then selects VM environments in which response time corresponding to an allowable transaction number is supposed to be shorter than or equal to an allowed value.

Allowable response time is determined under, for example, a contract between a user and an operator of the information processing system. Allowable response time may differ among different virtual machines. Information indicative of allowable response time may be inputted by the manager to the management server 100 or be stored in the machine information storage section 110. The movement destination determination section 122 specifies one of the selected candidate VM environments as a movement destination for the virtual machine which is short of resources.

The movement performance section 123 exercises control so as to move a virtual machine which is short of resources and which is detected by the movement destination determination section 122 to a VM environment specified by the movement destination determination section 122. For example, if the specified VM environment is assigned to a virtual machine in a stopped or end state, then the movement performance section 123 requires a physical machine which has the VM environment to release the VM environment. The movement performance section 123 then gives a movement source physical machine and the movement destination physical machine instructions to move the virtual machine. Hypervisors of the movement source physical machine and the movement destination physical machine cooperate to move the virtual machine.

As stated above, the physical machine 200 includes the hypervisor 210 and the virtual machine 220. The hypervisor 210 includes a structure information transmitter 211. The virtual machine 220 includes an OS 221 and an operation log transmitter 222. The structure information transmitter 211 and the operation log transmitter 222 are implemented as, for example, program modules executed by a CPU of the physical machine 200. The hypervisors 210a and 210b are also realized by the same structure that is adopted in the hypervisor 210. The virtual machines 220a, 220b, 230, 230a, and 230b are also realized by the same structure that is adopted in the virtual machine 220.

The structure information transmitter 211 confirms as the latest structure resources included in the physical machine 200, virtual machines (virtual machines 220 and 230) deployed on the physical machine 200, and a resource assigned to each virtual machine. The structure information transmitter 211 then generates structure information indicative of the confirmed items and transmits it to the management server 100. The structure information transmitter 211 may transmit the structure information in response to a request from the management server 100 or transmit the structure information spontaneously.

The operation log transmitter 222 is implemented as, for example, middleware which operates on the OS 221. The operation log transmitter 222 confirms a state in which the virtual machine 220 uses a resource at this point of time and a state in which the virtual machine 220 performs a transaction at this point of time. The operation log transmitter 222 then generates an operation log indicative of the confirmed items and transmits it to the management server 100. The operation log transmitter 222 may transmit the operation log in response to a request from the management server 100 or transmit the operation log spontaneously.

FIG. 8 indicates an example of a physical machine table.

A physical machine table 111 is stored in the machine information storage section 110 of the management server 100. Information included in structure information collected from the physical machines 200, 200a, and 200b is registered in the physical machine table 111. The physical machine table 111 includes Physical Machine Name, CPU, RAM, Virtual Machine Number, and Virtual Machine Name items.

Identification information for a physical machine is registered in the Physical Machine Name item. A network address may be used as identification information. A CPU clock number is registered in the CPU item as the amount of a CPU resource included in the physical machine. A byte number of a RAM area is registered in the RAM item as the amount of a RAM resource included in the physical machine. The number of virtual machines deployed on the physical machine is registered in the Virtual Machine Number item. Identification information for the virtual machines deployed on the physical machine is enumerated in the Virtual Machine Name item.

For example, the amount of a CPU resource included in the physical machine 200 (M1) is 2 GHz and the amount of a RAM resource included in the physical machine 200 (M1) is 2 GB. Furthermore, the amount of a CPU resource included in the physical machine 200a (Ma) is 4 GHz and the amount of a RAM resource included in the physical machine 200a (Ma) is 4 GB. As stated above, the virtual machines 220 and 230 (VM1 and VM2) are deployed on the physical machine 200 and the virtual machines 220a and 230a (VMa1 and VMa2) are deployed on the physical machine 200a.

FIG. 9 indicates an example of a virtual machine table.

A virtual machine table 112 is stored in the machine information storage section 110 of the management server 100. Information included in structure information collected from the physical machines 200, 200a, and 200b is registered in the virtual machine table 112. The virtual machine table 112 includes Virtual Machine Name, Assigned CPU, Assigned RAM, and State items.

Identification information for a virtual machine is registered in the Virtual Machine Name item. A network address may be used as identification information. A CPU clock number is registered in the Assigned CPU item as a CPU resource amount assigned to the virtual machine. A byte number of a RAM area is registered in the Assigned RAM item as a RAM resource amount assigned to the virtual machine. A value indicative of a state of the virtual machine is registered in the State item. As stated above, a state of the virtual machine is an executing state, a stopped state, or an end state.

For example, a CPU resource amount assigned to the virtual machine 220 (VM1) is 1.6 GHz and a CPU resource amount assigned to the virtual machine 230 (VM2) is 0.8 GHz. The amount of the CPU resource included in the physical machine 200 is 2 GHz, so an overcommit is performed. In addition, a CPU resource amount assigned to the virtual machine 220a (VMa1) is 3.4 GHz and a CPU resource amount assigned to the virtual machine 230a (VMa2) is 1.2 GHz. The amount of the CPU resource included in the physical machine 200a is 4 GHz, so an overcommit is performed. Furthermore, the virtual machines 220 and 230 are in an executing state and the virtual machines 220a and 230a are in a stopped state.

FIG. 10 indicates an example of an operation log table.

An operation log table 113 is stored in the machine information storage section 110 of the management server 100. Information included in operation logs collected from the physical machines 200, 200a, and 200b is registered in the operation log table 113. In the example of FIG. 10, the management server 100 collects operation logs at intervals of 10 minutes. The operation log table 113 includes Virtual Machine Name, Time, Used CPU, Used RAM, Transaction, and Response items.

Identification information for a virtual machine which generates an operation log is registered in the Virtual Machine Name item. Time at which the operation log is generated is registered in the Time item. A CPU usage rate of the virtual machine at the time of the operation log being generated is registered in the Used CPU item. A CPU usage rate of the virtual machine is a rate at which a CPU resource assigned to the virtual machine is used. A byte number of a RAM area is registered in the Used RAM item as a RAM resource amount used by the virtual machine at the time of the operation log being generated.

A transaction number at the time of the operation log being generated is registered in the Transaction item. A transaction number determined may be the number of transactions which the virtual machine is performing at a point of time, the average of transaction numbers in certain periods just before, the number of requests received in a certain period just before, or the like. Response time per transaction (period from the time when a request is received to the time when a response is returned) at the time of the operation log being generated is registered in the Response item. Response time determined may be response time of a sampled transaction, the average of response time of sampled transactions, the average of response time of transactions which ended in a certain period just before, or the like.

An example of a procedure for controlling the movement of the virtual machine 230 by the management server 100 will now be described.

Figure 11:
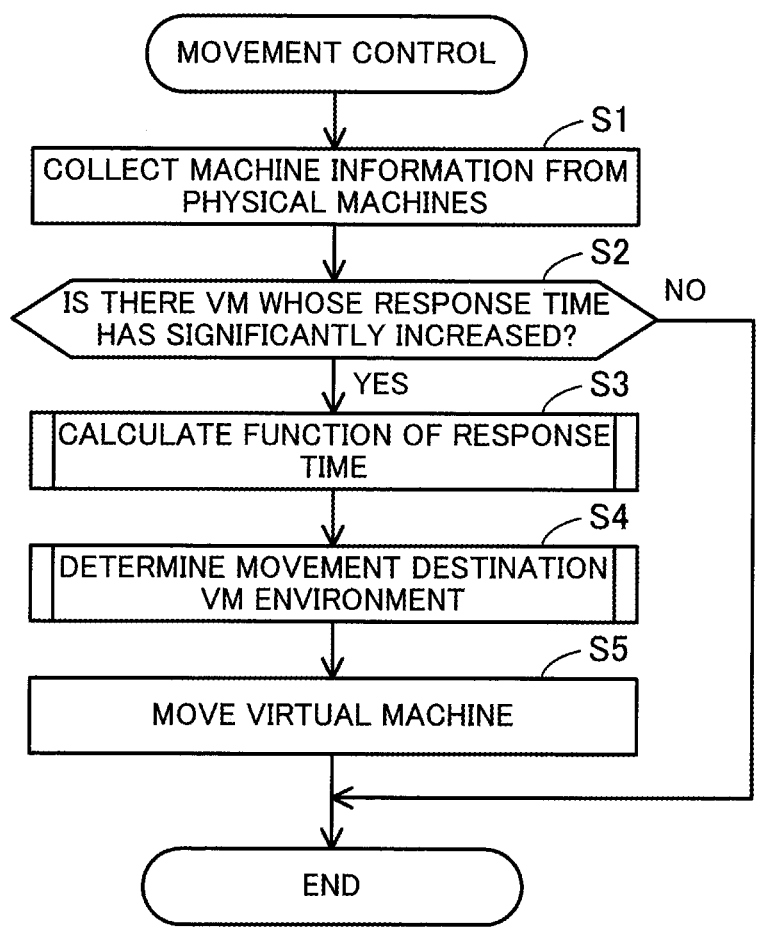
FIG. 11 is a flow chart of an example of a procedure for movement control.

FIG. 11 is a flow chart of an example of a procedure for movement control.

(S1) The machine information collection section 121 collects machine information from the physical machines

200, 200*a*, and 200*b* and stores it in the machine information storage section 110. Structure information, of the machine information, registered in the physical machine table 111 and the virtual machine table 112 is collected from a hypervisor of each physical machine. In addition, an operation log registered in the operation log table 113 is collected from each virtual machine on the physical machines 200, 200*a*, and 200*b*.

(S2) The movement destination determination section 122 refers to the operation log table 113 stored in the machine information storage section 110, and detects a virtual machine, of the virtual machines 220, 220*a*, 220*b*, 230, 230*a*, and 230*b*, whose response time has significantly increased. For example, the movement destination determination section 122 detects a virtual machine whose latest response time is longer than or equal to a threshold, a virtual machine for which the amount or rate of an increase in response time is larger than or equal to a threshold, or the like. These thresholds may be determined under a contract with a user or differ among different users.

The movement destination determination section 122 then determines whether or not there are virtual machines in point (virtual machines which are considered to be short of resources). If there are virtual machines in point, then step S3 is performed. The following steps S3 through S5 are performed on each of the virtual machines in point. If there are no virtual machines in point, then the movement control ends and the movement destination determination section 122 waits until timing at which the next operation logs are collected. In the following description it is assumed that the virtual machine 230 meets the above condition.

(S3) The movement destination determination section 122 searches the physical machine table 111 stored in the machine information storage section 110 for structure information for the physical machine 200 on which the virtual machine 230 is deployed. Furthermore, the movement destination determination section 122 searches the virtual machine table 112 stored in the machine information storage section 110 for structure information for the virtual machines 220 and 230 deployed on the physical machine 200. In addition, the movement destination determination section 122 searches the operation log table 113 for an operation log of the virtual machine 230. The movement destination determination section 122 then calculates from the above structure information and operation log a function of response time at the time of the virtual machine 230 operating on the physical machine 200. A function calculation method will be described later in detail.

(S4) The movement destination determination section 122 confirms an allowable transaction number and allowable response time of the virtual machine 230. Furthermore, the movement destination determination section 122 searches the physical machine table 111 and the virtual machine table 112 for VM environments on the physical machines 200*a* and 200*b*. The movement destination determination section 122 then searches for a VM environment (candidate movement destination) which meets the condition of the allowable response time, and determines a movement destination VM environment. A movement destination determination method will be described later in detail.

(S5) The movement performance section 123 exercises control so as to move the virtual machine 230 from the physical machine 200 to a physical machine having the VM environment which the movement destination determination section 122 determines. For example, the movement performance section 123 gives the movement destination physical machine instructions to assign the VM environment to the virtual machine 230. If the VM environment has been assigned to a virtual machine in a stopped state, then the virtual machine in a stopped state may be moved to another physical machine. If the VM environment has been assigned to a virtual machine in an end state, then the virtual machine in an end state may be eliminated.

The movement performance section 123 then gives the physical machine 200 and the movement destination physical machine instructions to move the virtual machine 230. The hypervisor 210 of the physical machine 200 and a hypervisor of the movement destination physical machine cooperate to move the virtual machine 230. For example, the hypervisor 210 copies data regarding the virtual machine 230 and the like on a RAM and a HDD to the movement destination physical machine. At this time an OS of the virtual machine 230 may temporarily be shut down or may not be shut down (live migration).

Figure 12:
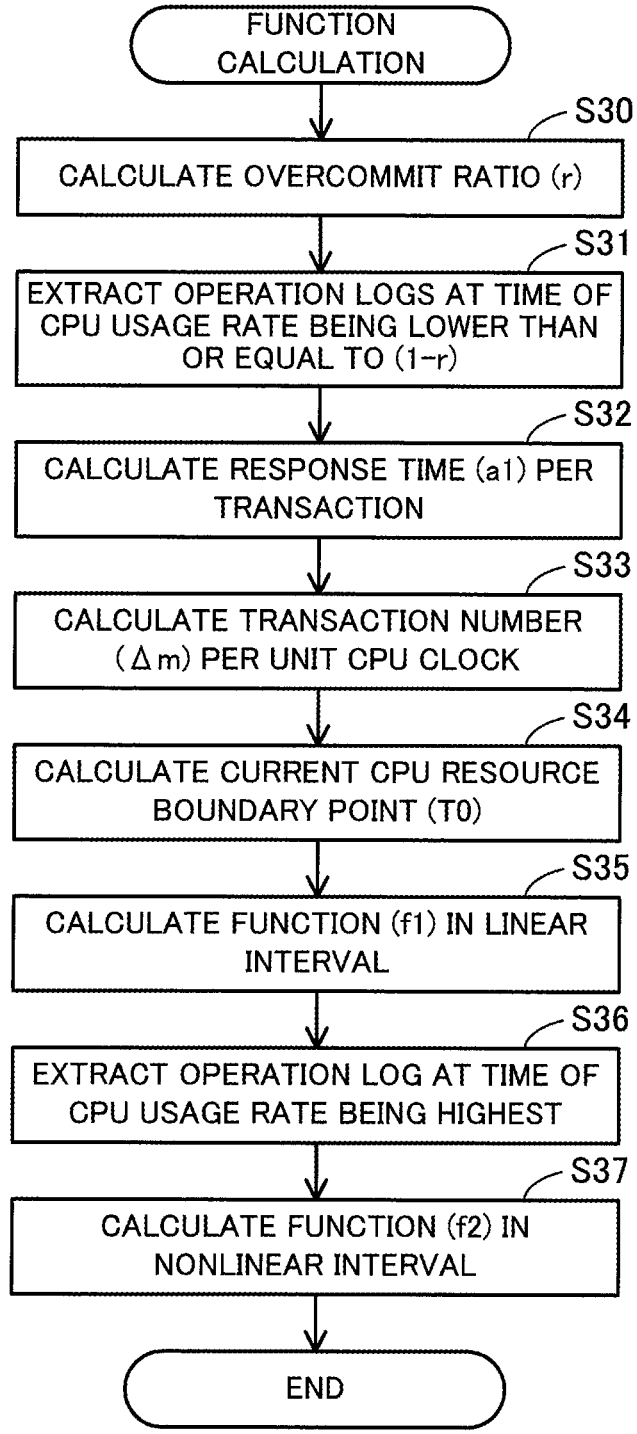
FIG. 12 is a flow chart of an example of a procedure for function calculation.

FIG. 12 is a flow chart of an example of a procedure for function calculation. A process indicated in FIG. 12 is performed in the above step S3.

(S30) The movement destination determination section 122 calculates an overcommit ratio r of the virtual machine 230. The overcommit ratio r indicates a rate of a portion, of a CPU resource assigned to the virtual machine 230, shared with the virtual machine 220. (1−r) indicates an occupation rate.

The overcommit ratio r is given by $$r = ((\text{total of CPU clock numbers assigned to the virtual machines 220 and 230}) - (\text{CPU clock number of the physical machine 200}))/(\text{CPU clock number assigned to the virtual machine 230})$$

For example, if the numeric values indicated in FIGS. 8 and 9 are used, then overcommit ratio r=(1.6 GHz+0.8 GHz−2 GHz)/0.8 GHz=0.5 (50%).

(S31) The movement destination determination section 122 extracts from the operation log table 113 operation logs of the virtual machine 230 at the time of a CPU usage rate being lower than or equal to the occupation rate (1−r). The extracted operation logs are used in the following steps S32 through S35 for estimating a function in a linear interval. The movement destination determination section 122 may extract only operation logs generated in a certain period just before.

(S32) On the basis of the operation logs extracted in step S31, the movement destination determination section 122 calculates as an average response time a1 per transaction in the linear interval.

The response time a1 per transaction is given by $$a1 = \text{sum}(\text{response time } i/\text{transaction number } i)/n$$

where n is the number of the operation logs extracted in step S31 and i is a variable having values from 1 to n. For example, if the numeric values indicated in FIG. 10 are used, then response time a1 per transaction=(0.4 s/400+0.25 s/250+0.1 s/100+0.02 s/20)/4=0.001 s.

(S33) On the basis of the operation logs extracted in step S31, the movement destination determination section 122 calculates as an average a transaction number Δm per unit CPU clock in the linear interval. This indicates the number of transactions which the virtual machine 230 can perform per unit CPU resource in a state in which a CPU resource amount used can be increased.

The transaction number Δm per unit CPU clock is given by $$\Delta m = \text{sum}(\text{transaction number } i/(\text{CPU usage rate } i \times \text{CPU clock number assigned}))/n$$

where n is the number of the operation logs extracted in step S31 and i is a variable having values from 1 to n. For example, if the numeric values indicated in FIGS. 9 and 10 are used, then the transaction number Δm per unit CPU clock=(400/(50%×0.8 GHz)+250/(31.2%×0.8 GHz)+100/(12.5%×0.8 GHz)+20/(2.5%×0.8 GHz))/4=1000.

(S34) On the basis of the overcommit ratio r calculated in step S30, the movement destination determination section 122 calculates a current CPU resource boundary point T0 of the virtual machine 230. The current CPU resource boundary point T0 indicates the amount of a CPU resource which the virtual machine 230 currently occupies.

The current CPU resource boundary point T0 is given by $$T0=(1-r)\times(\text{CPU clock number assigned to the virtual machine 230})$$

For example, if the numeric values indicated in FIGS. 8 and 9 are used, then current CPU resource boundary point T0=(1−0.5)×0.8 GHz=0.4 GHz (S35) The movement destination determination section 122 calculates a function f1(m) in the linear interval. The function f1(m) indicates the relationship between a transaction number and response time of the virtual machine 230. This relationship exists until a CPU resource amount used reaches the CPU resource boundary point T0.

The function f1(m) in the linear interval is given by $$f1(m)=a1\times m$$

where the response time a1 per transaction is calculated in step S32 and m indicates a transaction number. The response time a1 per transaction corresponds to the slope of a straight line in the linear interval.

Response time (response time corresponding to the CPU resource boundary point T0) f1(Δm×T0) at the time of a CPU resource amount used reaching the CPU resource boundary point T0 is given by $$f1(\Delta m\times T0)=a1\times\Delta m\times T0$$

where the transaction number Δm per unit CPU clock is calculated in step S33. For example, if the numeric values indicated in FIGS. 8 through 10 are used, then f1(Δm×T0)=0.001 s×1000×0.4 GHz=0.4 s (S36) The movement destination determination section 122 extracts from the operation log table 113 an operation log of the virtual machine 230 at the time of a CPU usage rate being highest. The extracted operation log is used in the following step S37 for estimating a function in a nonlinear interval. The movement destination determination section 122 may extract only an operation log generated in a certain period just before.

(S37) The movement destination determination section 122 calculates a function f2(m) in the nonlinear interval on the basis of the operation log extracted in step S36. The function f2(m) indicates the relationship between a transaction number and response time of the virtual machine 230. This relationship exists from the time when a CPU resource amount used reaches the CPU resource boundary point T0. In this case, an exponential function is used as the function f2(m).

The function f2(m) in the nonlinear interval is given by $$f2(m)=a2\times(m-\Delta m\times T0)^2+a1\times\Delta m\times T0$$

where m is a variable indicative of a transaction number. The function f2(m) is an exponential function with a reference point on the straight line in the linear interval. The coefficient a2 of the exponential term is calculated by substituting in the above expression a transaction number and response time indicated in the operation log extracted in step S36. For example, if the numeric values indicated in FIGS. 8 through 10 are used, then $$50.4\ s=a2\times(500-1000\times 0.4\ \text{GHz})^2+0.4\ s$$

Therefore, $$a2=0.005$$

As a result, the function f2(m) in the nonlinear interval is expressed as $$f2(m)=0.005\times(m-400)^2+0.4\ s$$

However, response time in the nonlinear interval may be estimated by another method.

FIG. 13 indicates an example of a response time table.

A response time table 114 is generated in place of the function f2(m) in the nonlinear interval in the above step S37 by the movement destination determination section 122. The response time table 114 includes Transaction, Response, and Differential items.

A transaction number ratio is registered in the Transaction item. This ratio is calculated with a maximum transaction number in the past as reference. This ratio is set, for example, in 1 p.c. Response time corresponding to a transaction number ratio is registered in the Response item. If there are two or more operation logs in which transaction number ratios are the same, then response time in one of them in which a CPU usage rate is the highest is adopted. The difference between response time registered in the Response item and response time (a1×Δm×T0) corresponding to the CPU resource boundary point T0 is registered in the Differential item.

In order to generate the response time table 114, the movement destination determination section 122 searches the operation log table 113 for an operation log of the virtual machine 230 in which a transaction number is the largest. The movement destination determination section 122 associates response time in the operation log with a transaction number ratio of 100 percent and registers them in the response time table 114. After that, the movement destination determination section 122 extracts operation logs from the operation log table 113 in descending order of transaction number. Each time the movement destination determination section 122 extracts an operation log, the movement destination determination section 122 calculates a transaction number ratio, associates the transaction number ratio with response time indicated in the operation log, and registers them in the response time table 114. The movement destination determination section 122 extracts operation logs until 0 s appears in the Differential item.

By generating the above response time table 114, the accuracy with which the relationship between a transaction number and response time in the nonlinear interval is estimated is improved. The response time table 114 may be stored in the RAM 102 or the HDD 103. The movement destination determination section 122 calculates (transaction number m)/(maximum transaction number in the past) and searches the response time table 114 by the use of a calculated rate. By doing so, response time corresponding to a transaction number m can be found in the nonlinear interval. A case where a movement destination of the virtual machine 230 is determined by the use of the above function f2(m) will now be described. However, a movement destination of the virtual machine 230 may be determined by the use of the response time table 114.

Figure 14:
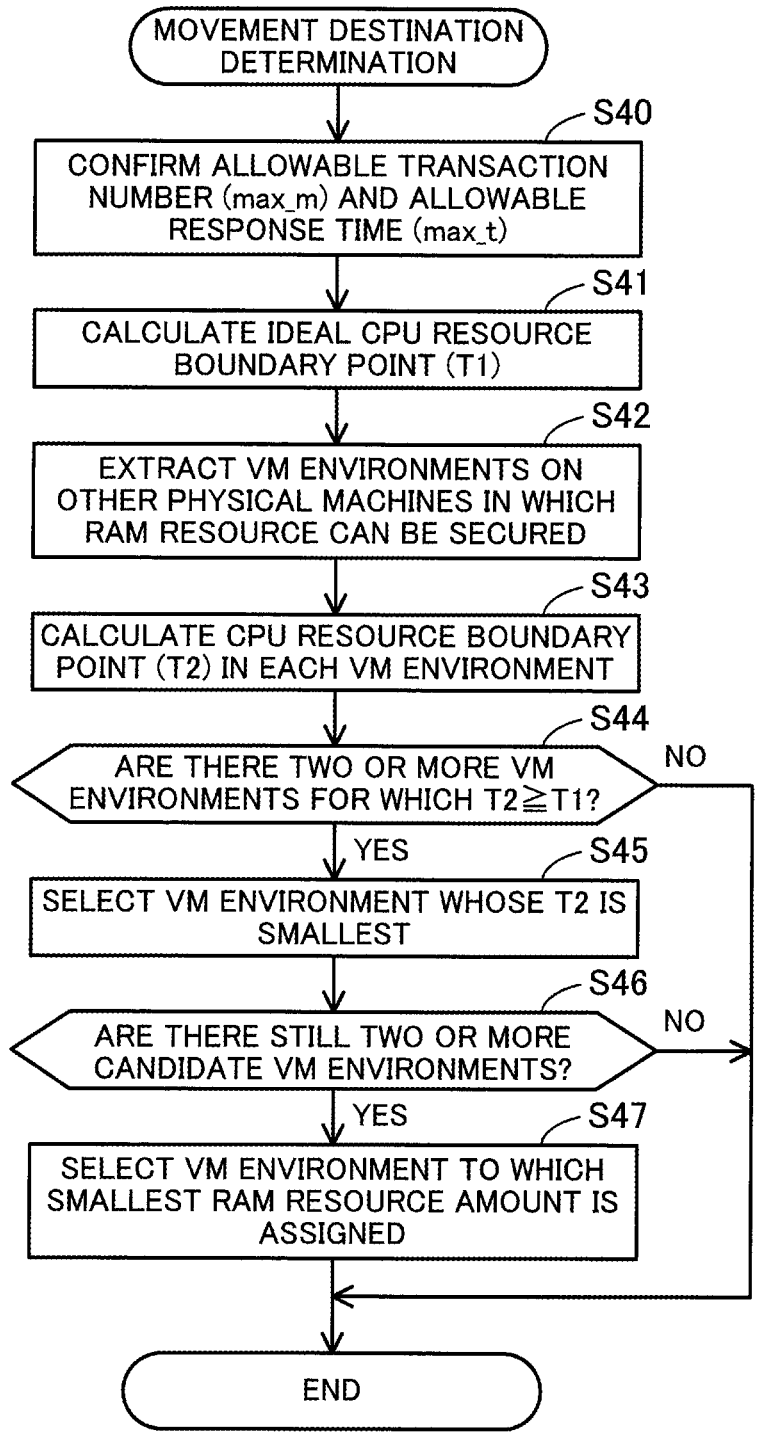
FIG. 14 is a flow chart of an example of a procedure for movement destination determination.

FIG. 14 is a flow chart of an example of a procedure for movement destination determination. A process indicated in FIG. 14 is performed in the above step S4.

(S40) The movement destination determination section 122 confirms an allowable transaction number max_m and allowable response time max_t of the virtual machine 230.

The allowable transaction number max_m is a maximum transaction number supposed. For example, the maximum value of past transaction numbers indicated in operation logs of the virtual machine 230 is used as the allowable transaction number max_m. The allowable response time max_t is the upper limit of allowed response time. The allowable response time max_t is determined, for example, under a contract between a user and the operator of the information processing system. The allowable response time max_t may differ among different users or different virtual machines. Information indicative of the allowable response time max_t is inputted to the management server 100, for example, by the operation of the manager and is stored.

(S41) On the basis of the function f1(m) in the linear interval, the function f2(m) in the nonlinear interval, the allowable transaction number max_m, and the allowable response time max_t, the movement destination determination section 122 calculates an ideal CPU resource boundary point T1. A case where a curve in the nonlinear interval is shifted so that the condition that response time corresponding to the allowable transaction number max_m is shorter than or equal to the allowable response time max_t will be met will be discussed. The ideal CPU resource boundary point T1 is the minimum value of CPU resource boundary points after shifts.

The ideal CPU resource boundary point T1 is calculated by solving the equation $$a2 \times (\max\_m - \Delta m \times T1)^2 + a1 \times \max\_m = \max\_t$$

For example, if the numeric values indicated in FIGS. 8 through 10 are used, then $$0.005 \times (500 - 1000 \times T1)^2 + 0.001 \text{ s} \times 500 = 5 \text{ s}$$

Therefore, $$T1 = 0.6 \text{ GHz}$$

This means that a VM environment in which a CPU resource that can be occupied is 0.6 GHz or more meets the condition that response time corresponding to the allowable transaction number max_m is shorter than or equal to the allowable response time max_t. A current CPU resource boundary point T0 is lower than 0.6 GHz.

(S42) The movement destination determination section 122 extracts from VM environments on the physical machines 200a and 200b VM environments in which a RAM resource amount which is larger than or equal to a RAM resource amount currently assigned to the virtual machine 230 can be secured. For example, if the numeric values indicated in FIG. 9 are used, then the movement destination determination section 122 extracts from VM environments on the physical machines 200a and 200b VM environments in which a RAM area larger than or equal to 1 GB can be secured.

It is assumed that a movement destination VM environment is secured by moving a virtual machine in a stopped state or eliminating a virtual machine in an end state. The movement destination determination section 122 may limit VM environments extracted in step S42 to VM environments assigned to virtual machines in a stopped or end state. Furthermore, the movement destination determination section 122 may select candidate movement destination VM environments and then determine whether or not the virtual machine 230 can utilize them.

In the following description it is assumed that the virtual machines 220a and 230a on the physical machine 200a are in a stopped state and that the virtual machine 230 can utilize a VM environment for the virtual machine 220a or 230a. If the virtual machines 220b and 230b on the physical machine 200b are in a stopped or end state, then the virtual machine 230 may also be moved to the physical machine 200b.

(S43) The movement destination determination section 122 calculates a CPU resource boundary point T2 of each of the VM environments extracted in step S42. A CPU resource boundary point T2 of a VM environment indicates a CPU resource amount which can be occupied in the VM environment.

A CPU resource boundary point T2 of a VM environment is calculated by the same method that is used for calculating the current CPU resource boundary point T0. That is to say, (overcommit ratio of a VM environment)=((total of CPU clock numbers assigned to VM environments on the same physical machine)−(CPU clock number of the physical machine))/(CPU clock number assigned to the VM environment). (CPU resource boundary point T2 of the VM environment)=(1−(overcommit ratio of the VM environment))×(CPU clock number assigned to the VM environment).

For example, if the numeric values indicated in FIGS. 8 and 9 are used, then (overcommit ratio of the virtual machine 220a)=(3.4 GHz+1.2 GHz−4 GHz)/3.4 GHz=0.176 (17.6%) and (its CPU resource boundary point T2)=(1−0.176)×3.4 GHz=2.8 GHz. Furthermore, (overcommit ratio of the virtual machine 220b)=(3.4 GHz+1.2 GHz−4 GHz)/1.2 GHz=0.5 (50%) and (its CPU resource boundary point T2)=(1−0.5)×1.2 GHz=0.6 GHz.

(S44) The movement destination determination section 122 determines whether or not there are two or more VM environments whose CPU resource boundary points T2 calculated in step S43 are larger than or equal to the ideal CPU resource boundary point T1 calculated in step S41. That is to say, the movement destination determination section 122 determines whether or not there are two or more VM environments which meet the condition that response time corresponding to the allowable transaction number max_m is shorter than or equal to the allowable response time max_t. For example, if the numeric values indicated in FIGS. 8 through 10 are used, then T1=0.6 GHz, (T2 of the virtual machine 220a)=2.8 GHz, and (T2 of the virtual machine 230a)=0.6 GHz. Accordingly, both of the virtual machines 220a and 230a meet the above condition. If there are two or more VM environments which meet the above condition, then the movement destination determination section 122 proceeds to step S45. If there is only one VM environment which meets the above condition, then the movement destination determination section 122 sets the VM environment as a movement destination of the virtual machine 230.

(S45) The movement destination determination section 122 selects, from among the VM environments whose CPU resource boundary points T2 are larger than or equal to the ideal CPU resource boundary point T1, a VM environment whose CPU resource boundary point T2 is the smallest. For example, if the numeric values indicated in FIGS. 8 through 10 are used, then (T2 of the virtual machine 220a)=2.8 GHz and (T2 of the virtual machine 230a)=0.6 GHz. Accordingly, the movement destination determination section 122 selects the virtual machine 230a.

(S46) The movement destination determination section 122 determines whether or not it selects two or more VM environments in step S45, that is to say, whether or not there are two or more VM environments whose CPU resource boundary points T2 are the smallest. If there are two or more VM environments whose CPU resource boundary points T2 are the smallest, then the movement destination determination section 122 proceeds to step S47. If there is only one VM environment whose CPU resource boundary point T2 is the smallest, then the movement destination determination section 122 sets the VM environment as a movement destination of the virtual machine 230. For example, if the numeric values indicated in FIGS. 8 through 10 are used, then the movement destination determination section 122 sets the VM environment of the virtual machine 230a as a movement destination of the virtual machine 230. In this case, the virtual machine 230a is moved to another physical machine.

(S47) The movement destination determination section 122 selects a VM environment to which the smallest RAM resource amount is assigned from among the two or more VM environments selected in step S45, and sets the VM environment as a movement destination of the virtual machine 230.

With the information processing system according to the second embodiment, a distinction is made on the basis of whether or not a used CPU resource is within an occupied portion, and the relationship between a transaction number and response time of the virtual machine 230 is calculated. On the basis of the calculated relationship and a CPU resource amount which can be occupied in a second VM environment, whether or not response time meets a determined condition in the case of the virtual machine 230 being moved to the second VM environment is then determined. As a result, the risk of competing with another virtual machine for a CPU resource, which is a shared portion, is evaluated suitably. Accordingly, even if an overcommit is performed, a proper VM environment is selected as a movement destination of the virtual machine 230.

The information processing in the first embodiment is realized by making the information processing apparatus 10 and the physical machines 21 and execute programs. In addition, the information processing in the second embodiment is realized by making the clients 31 and 32, the management server 100, and the physical machines 200, 200a, and 200b execute programs.

The programs are recorded in a computer-readable record medium (record medium 43, for example). A magnetic disk, an optical disk, a magneto-optical disk, a semiconductor memory, or the like is used as a record medium. A magnetic disk may be a FD or a HDD. An optical disk may be a CD, a CD-R(Recordable)/RW(ReWritable), a DVD, or a DVD-R/RW. The programs may be recorded in portable record media and be distributed. In that case, the programs may be duplicated (installed) from a portable record medium to another record medium, such as a HDD, (HDD 103, for example) and be executed.

According to an aspect, the accuracy with which response time of a virtual machine after movement is estimated is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable, non-transitory storage medium storing a computer program that causes a computer to perform a process comprising:
    calculating, at the time of moving a virtual machine that operates on a first physical machine, an amount of a first resource that the virtual machine can use on a second physical machine without sharing with another virtual machine based on state information that indicates a deployment state of other virtual machines on the second physical machine; and
    estimating second response time of the virtual machine at the time of moving the virtual machine to the second physical machine on the basis of first response time of the virtual machine at the time of the virtual machine operating on the first physical machine and the amount of the first resource,
    wherein the estimating of second response time uses a first estimation algorithm when the virtual machine is expected to use resources within the amount of the first resource, and uses a second estimation algorithm when the virtual machine is expected to use more resources than the amount of the first resource, the second estimation algorithm assuming use of a second resource that is assigned to the virtual machine moved to the second physical machine for shared use with other virtual machines on the second physical machine;
    wherein the second physical machine is provided in plurality; and
    the process further includes selecting a second physical machine for which the second response time meets a determined condition from among the plurality of second physical machines as a movement destination of the virtual machine.

2. The computer-readable, non-transitory storage medium according to claim 1, wherein when there are two or more second physical machines for which the second response time meets the determined condition, the process further includes preferentially selecting a second physical machine on which an amount of the first resource is the smallest from the two or more second physical machines.

3. The computer-readable, non-transitory storage medium according to claim 1, wherein:
    the process further includes calculating an amount of a third resource which the virtual machine can use on the first physical machine without sharing with another virtual machine; and
    the estimating of the second response time includes determining a parameter value of the second estimation algorithm by using the first response time when the virtual machine uses resources exceeding the amount of the third resource.

4. The computer-readable, non-transitory storage medium according to claim 1, wherein:
    the process further includes calculating an amount of a third resource which the virtual machine can use on the first physical machine without sharing with another virtual machine; and
    the estimating of the second response time includes determining a parameter value of the first estimation algorithm by using the first response time when the virtual machine uses a smaller amount of resources than or equal to the amount of the third resource.

5. A virtual machine management method comprising:
  calculating, by a processor, an amount of a first resource, at the time of moving a virtual machine that operates on a first physical machine, that the virtual machine can use on a second physical machine without sharing with another virtual machine based on state information that indicates a deployment state of other virtual machines on the second physical machine; and
  estimating, by the processor, second response time of the virtual machine at the time of moving the virtual machine to the second physical machine on the basis of first response time of the virtual machine at the time of the virtual machine operating on the first physical machine and the amount of the first resource,
  wherein the estimating of second response time uses a first estimation algorithm when the virtual machine is expected to use resources within the amount of the first resource, and uses a second estimation algorithm when the virtual machine is expected to use more resources than the amount of the first resource, the second estimation algorithm assuming use of a second resource that is assigned to the virtual machine moved to the second physical machine for shared use with other virtual machines on the second physical machine;
  wherein the second physical machine is provided in plurality; and
  the process further includes selecting a second physical machine for which the second response time meets a determined condition from among the plurality of second physical machines as a movement destination of the virtual machine.

6. An information processing apparatus comprising:
  a memory which stores information indicative of first response time of a virtual machine that operates on a first physical machine and state information indicative of a deployment state of other virtual machines on the second physical machine; and
  a processor which calculates an amount of a first resource that the virtual machine can use on the second physical machine without sharing with another virtual machine based on the state information and which estimates second response time of the virtual machine at the time of moving the virtual machine to the second physical machine on the basis of the first response time and the amount of the first resource;
  wherein the processor estimates the second response time, by using a first estimation algorithm when the virtual machine is expected to use resources within the amount of the first resource, and by using a second estimation algorithm when the virtual machine is expected to use more resources than the amount of the first resource, the second estimation algorithm assuming use of a second resource that is assigned to the virtual machine moved to the second physical machine for shared use with other virtual machines on the second physical machine;
  wherein the second physical machine is provided in plurality; and
  the process further includes selecting a second physical machine for which the second response time meets a determined condition from among the plurality of second physical machines as a movement destination of the virtual machine.

7. The computer-readable, non-transitory storage medium according to claim 1, wherein:
  the first estimation algorithm assumes that their response times increase linearly as requests increase in number; and
  the second estimation algorithm assumes that response times increase non-linearly as requests increase in number.

* * * * *